United States Patent
Filsinger et al.

(10) Patent No.: US 10,167,905 B2
(45) Date of Patent: Jan. 1, 2019

(54) WET DUAL MULTI-PLATE CLUTCH WITH LEVERS OUTSIDE THE WET CHAMBER

(71) Applicant: SCHAEFFLER TECHNOLOGIES AG & CO. KG, Herzogenaurach (DE)

(72) Inventors: Andreas Filsinger, Neckargemünd (DE); Patrick Weydmann, Bühl (DE); Gerhard Gander, Bühlertal (DE); Alexander Obitz, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 149 days.

(21) Appl. No.: 15/322,164

(22) PCT Filed: Jun. 9, 2015

(86) PCT No.: PCT/DE2015/200353
§ 371 (c)(1),
(2) Date: Dec. 26, 2016

(87) PCT Pub. No.: WO2015/197063
PCT Pub. Date: Dec. 30, 2015

(65) Prior Publication Data
US 2017/0152900 A1 Jun. 1, 2017

(30) Foreign Application Priority Data
Jun. 27, 2014 (DE) .......................... 10 2014 212 421

(51) Int. Cl.
*F16D 21/06* (2006.01)
*F16D 13/38* (2006.01)
(Continued)

(52) U.S. Cl.
CPC ............. *F16D 21/06* (2013.01); *A01D 69/08* (2013.01); *F16D 13/385* (2013.01); *F16D 13/52* (2013.01);
(Continued)

(58) Field of Classification Search
CPC ........ F16D 21/06; F16D 13/385; F16D 13/52; F16D 13/72; F16D 23/12; F16D 2021/0676; F16D 2023/126; A01D 69/08
See application file for complete search history.

(56) References Cited

U.S. PATENT DOCUMENTS 2,687,198 A * 8/1954 Greenlee ............... F16D 13/385
192/113.35
3,187,867 A * 6/1965 Sink ........................ F16D 21/06
192/48.9
(Continued)

FOREIGN PATENT DOCUMENTS

DE 2 314 226 11/1973
DE 10 2006 040 506 A1 3/2008
(Continued)

OTHER PUBLICATIONS

International Search Report for International Application No. PCT/DE2015/200353.
(Continued)

*Primary Examiner* — Jacob S. Scott
*Assistant Examiner* — Tinh Dang
(74) *Attorney, Agent, or Firm* — Kevin L. Parks (57) ABSTRACT

A multi-plate dual clutch for coupling a motor vehicle engine to a drive shaft of a motor vehicle transmission and to an auxiliary power take-off output shaft of the motor vehicle. The dual clutch includes a drive clutch for coupling the motor vehicle engine with the drive shaft, and an auxiliary power take-off clutch for coupling the motor vehicle engine with the auxiliary output shaft. The drive clutch and the auxiliary power take-off clutch can each to be operated independently of one another by a separate lever mechanism. The dual clutch includes a wet chamber housing in which the drive clutch and the auxiliary power take-off clutch are accommodated in fluid-tight relationship, while (Continued)

the respective lever mechanisms for the drive clutch and the auxiliary power take-off clutch are located outside the wet chamber housing.

20 Claims, 6 Drawing Sheets (51) Int. Cl.
*F16D 13/52* (2006.01)
*F16D 13/72* (2006.01)
*F16D 23/12* (2006.01)
*A01D 69/08* (2006.01)

(52) U.S. Cl.
CPC ............. *F16D 13/72* (2013.01); *F16D 23/12* (2013.01); *F16D 2021/0676* (2013.01); *F16D 2023/126* (2013.01); *F16D 2300/08* (2013.01); *F16D 2300/12* (2013.01); *F16D 2300/26* (2013.01)

(56) References Cited

U.S. PATENT DOCUMENTS

| | | | |
|---|---|---|---|
| 3,760,918 A | 9/1973 | Wetrich et al. | |
| 4,085,835 A * | 4/1978 | Bailey | F16D 13/72 192/113.34 |
| 6,814,197 B2 * | 11/2004 | Heiartz | F16D 23/14 192/115 |
| 7,287,634 B2 * | 10/2007 | Agner | F16D 25/123 192/48.603 |
| 7,637,362 B2 | 12/2009 | Swinford-Meyer et al. | |
| 7,966,901 B2 * | 6/2011 | Metzinger | F16D 13/52 192/48.619 |
| 8,607,949 B2 * | 12/2013 | Noehl | F16D 13/70 192/48.606 |
| 9,080,636 B2 * | 7/2015 | Agner | F16D 3/12 |
| 9,631,683 B2 * | 4/2017 | Hua | F16D 23/14 |
| 10,119,577 B2 * | 11/2018 | Kirchhoffer | F16D 21/02 |
| 2005/0139442 A1 | 6/2005 | Agner et al. | |
| 2015/0159706 A1 | 6/2015 | Fünfgeld et al. | |

FOREIGN PATENT DOCUMENTS

| | | |
|---|---|---|
| DE | 10 2012 207 244 A1 | 11/2012 |
| DE | 10 2013 214 966 A1 | 2/2014 |
| DE | 10 2013 215 079 A1 | 2/2014 |
| EP | 1 548 313 A2 | 6/2005 |
| WO | WO 2006/0844435 A1 | 8/2006 |
| WO | WO 2014/019584 A1 | 2/2014 |

OTHER PUBLICATIONS

International Preliminary Report on Patentability for International Application No. PCT/DE2015/200353.

* cited by examiner

WET DUAL MULTI-PLATE CLUTCH WITH LEVERS OUTSIDE THE WET CHAMBER

CROSS-REFERENCE TO RELATED APPLICATIONS

This application is the U.S. national phase patent application under 35 U.S.C. § 371 of International Patent Application Serial No. PCT/DE2015/200353, having an international filing date of 9 Jun. 2015, and designating the United States, which claims priority based upon German Patent Application No. DE 10 2014 212 421.2, filed on 27 Jun. 2014, the entire contents of each of which applications are hereby incorporated by reference herein to the same extent as if fully rewritten.

BACKGROUND OF THE INVENTION

Field of the Invention

The present invention relates to a dual clutch, in particular a multi-plate dual clutch for coupling a drive shaft of a motor vehicle engine to a transmission shaft of a motor vehicle transmission and/or an auxiliary output shaft of an auxiliary power take-off of the motor vehicle, in particular a power take-off shaft. The dual clutch includes a drive clutch for coupling the motor vehicle engine with the transmission shaft and an auxiliary power take-off clutch for coupling the motor vehicle engine with the auxiliary output shaft. The drive clutch and the auxiliary power take-off clutch are each to be actuated independently of one another by means of a separate lever mechanism.

Description of the Related Art

Dry dual clutches that are installed outside of the transmission on the vehicle and are actuated mechanically are known from the prior art. Such conventional dual clutches have a first clutch for driving operation, the so-called drive clutch or drive shaft clutch, and a second clutch for an auxiliary drive, for example a power take-off drive, the so-called auxiliary drive clutch or power take-off drive clutch. A distinction is made between conventional dual clutches, in which the drive shaft clutch and the power take-off shaft clutch are engaged in the deactivated state, and safety clutches (so-called safety PTO dual clutches), in which the drive shaft clutch is engaged in the deactivated state and the power take-off shaft clutch is disengaged in the deactivated state.

It is disadvantageous that in such known dry dual clutches the maximum thermal absorptive capacity of the clutches and the maximum thermal capacity of the clutch linings as a rule is quickly reachable, in particular when transmitting high torques. Increasing the transmissible torque while keeping the construction size the same is therefore limited. In the critical load range, high wear of the friction linings and a resulting change of the operating points and clamping forces is therefore the negative consequence.

Added to the problem situation described above is the fact that the average power of motor vehicles using dual clutches, for example tractors, and thus the demands on the clutches, are constantly growing. Present-day tractor dual clutches have reached their performance limits in some cases, especially with regard to thermal demands.

In WO 2006/084435 A1 a clutch unit is disclosed having a housing that is attachable to a flywheel. To make a first and a second clutch in that clutch unit two contact plates are contained which are non-rotating relative to the housing but are axially movable, and to each of which a clutch disk is assigned. The clutches are actuatable independently of one another by means of lever arrangements that are swivel-mounted on the housing, wherein one lever arrangement is coupled with each contact plate to disengage and engage the corresponding clutch The first clutch facing the flywheel is engaged in the non-actuated state by means of a diaphragm spring clamped between its contact plate and the housing, the diaphragm spring being positioned axially between the adjacent contact plates. The second clutch, provided on the side of the first clutch facing away from the flywheel, is disengaged in the non-actuated stage and is forced closed by a force exerted on its lever arrangement, the lever arrangement of the second clutch being coupled with the assigned contact plate by means of axially operative tensile elements. There is at least one spring element clamped between the tensile elements and the contact plate, which has a predetermined pre-tensioning when the second friction clutch is disengaged and undergoes an additional elastic deformation as the second clutch is engaged.

In DE 10 2012 207 244 A1 a clutch arrangement is disclosed for use in the drive train of a tractor, including a drive clutch and an auxiliary drive clutch, wherein the drive clutch is positioned between an internal combustion engine and a transmission input shaft, and the auxiliary drive clutch is positioned between the internal combustion engine and an auxiliary drive, wherein the clutch arrangement includes a clutch housing having a formed sheet metal part.

In DE 10 2013 214 966 A1 a dual clutch is disclosed for coupling a drive shaft of a motor vehicle engine with a transmission shaft of a motor vehicle transmission, and/or an auxiliary power take-off of the motor vehicle, in particular a power take-off shaft. The dual clutch includes a first friction clutch for frictionally pressing a first clutch disk that is couplable with the transmission shaft between a first contact plate and a first counter plate, wherein the first contact plate is movable in an axial direction to engage the first friction clutch. A second friction clutch is included for frictionally pressing a second clutch disk that is couplable with the auxiliary power take-off between a second contact plate and a second counter plate, wherein the second contact plate is movable in the axial direction to engage the second friction clutch. A first actuating element is provided to move the first contact plate and a second actuating element is provided to move the second contact plate, wherein the second contact plate is connected to a thrust ring that is operationally connected to the second actuating element to transmit the displacing movement. A pre-stressed pressure storage element is positioned between the second actuating element and the thrust ring.

In DE 10 2013 215 079 A1 a dual clutch is disclosed for coupling a drive shaft of a motor vehicle engine with a transmission shaft of a motor vehicle transmission and/or to an auxiliary power take-off of the motor vehicle, in particular a power take-off shaft. The dual clutch includes a first friction clutch for frictionally pressing a first clutch disk that is couplable with the transmission shaft between a first contact plate and a first counter plate, wherein the first contact plate is movable in an axial direction to engage the first friction clutch. A second friction clutch is provided for frictionally pressing a second clutch disk that is couplable with the auxiliary power take-off between a second contact plate and a second counter plate, wherein the second contact plate is movable in the axial direction to engage the second friction clutch. The dual clutch includes a first actuating element to move the first contact plate and a second actuating element to move the second contact plate. The second contact plate is connected to a thrust ring that is operationally connected to the second actuating element to transmit the displacing movement. The second actuating element has at least one spring element for pre-biasing, wherein the at least one spring element is positioned between the second actuating element and the thrust ring.

Starting from the above-identified prior art, an object of the present invention is to develop a dual clutch that can absorb and remove more frictional heat with the same or only slightly greater construction space, and, in addition, offers easy increase of the maximum torque. The dual clutch in accordance with the present invention should be capable of replacing known dual clutches with minimal modification effort and expense for the customer (a plug-in solution).

SUMMARY OF THE INVENTION

The object noted above is achieved by the present invention in the case of a clutch conforming to the genre, the dual clutch having a wet chamber housing in which the drive clutch and the power take-off clutch are accommodated fluid-tight, while the respective lever mechanisms for the drive clutch and for the auxiliary power take-off clutch are located outside the wet chamber housing. The dual clutch according to the present invention is preferably designed as a multi-plate clutch. A wet chamber housing is understood to mean a housing that is capable, inherently or through the use of seals, of creating a space that contains lubricant and is sealed/delimited against the outside.

A particular advantage of the present invention is that a conventional, existing dual clutch, for example a dry dual clutch, can be exchanged for a wet dual clutch according to the present invention with only a little modification effort and expense for the customer. The dual clutch according to the present invention is actuated by means of a lever mechanism that is outside the wet chamber housing. The clutch friction devices of both a drive clutch and an auxiliary power take-off clutch are located in a sealed area known as the wet chamber, which is enclosed by the wet chamber housing and is sealed fluid-tight. The dual clutch can therefore be designed and used advantageously as a wet clutch, so that with the same or only slightly greater construction space compared to known dual clutches according to the genre, a large volume of frictional heat can be absorbed and removed. In addition, the dual clutch according to the present invention is especially well suited for transmitting high maximum torques.

The drive clutch and the auxiliary power take-off clutch are actuatable independently of one another; in particular they are engageable simultaneously. The dual clutch according to the present invention is thus especially well suited for use in agricultural machinery such as tractors.

Advantageous embodiments of the invention will be explained in greater detail below.

According to one embodiment of the present invention, the dual clutch can have a clutch housing that supports the lever mechanisms. A drive clutch friction lining that is coupled with the drive shaft can be positioned compressably between a first clamping plate and the clutch housing. An auxiliary output friction lining that is coupled with the auxiliary output shaft can be positioned compressably between a second clamping plate and the clutch housing. The first contact plate and the second contact plate can each be indirectly or directly operationally connected and movable, in particular movable independently of one another, to engage the drive clutch and the auxiliary power take-off clutch by means of the applicable lever mechanism. The friction linings can be designed in particular as disk packs.

The wet chamber housing preferably rests against the clutch housing through a seal, preferably a labyrinth seal, and is sealed in relation to the clutch housing.

In one embodiment, the wet chamber housing can have a first wet chamber housing half with a first housing part and a second housing part. The housing parts are joined with one another fluid-tight in an advantageous manner, in particular welded to one another, for example by means of a laser-welded seam. Housing sealing can be located between the two housing halves. In one form of the invention, the first wet chamber housing half rests against the clutch housing through the seal or labyrinth seal and is sealed in relation to the clutch housing. It is of particular advantage if one housing part or a plurality of housing parts or all housing parts are formed sheet metal parts, in particular deep drawn parts.

In one embodiment, the wet chamber housing has a second wet chamber housing half that can be securely connected to the clutch housing, in particular by welding. It can also rest closely against the drive shaft and/or the output shaft, providing a seal, in particular by means of an oil seal.

It is of particular advantage if the wet chamber housing or the first wet chamber housing half has a flange for connection to the motor vehicle structure, preferably on a transmission housing, in particular for connecting it in a non-rotatable condition. That enables the clutch to be positioned especially easily on the vehicle, and is well suited for exchanging an already existing clutch.

In another embodiment of the present invention, the wet chamber housing or the first wet chamber housing half can form a bearing seat, in particular for a roller bearing that supports the clutch housing so that it can rotate relative to the wet chamber housing. Such an arrangement is easy to assemble. The roller bearing is preferably a sealed bearing, so that no additional measures are necessary to seal the wet chamber at that location.

The wet chamber housing preferably has a coolant inlet, in particular a cooling oil inlet, and additionally, or alternatively, a coolant outlet (cooling oil outlet) on its underside. In that way, the interior space or wet chamber surrounded by the wet chamber housing, in which the drive clutch and the auxiliary power take-off clutch with the respective corresponding actuating mechanisms are accommodated, can be flushed with coolant especially simply. Through the connections, for example, cooling oil from an oil reservoir, or transmission oil from the transmission, can be introduced into the wet chamber and returned from it back into the oil sump of the transmission through the outlet. For the most effective possible return of oil from the wet chamber housing, it is beneficial if a coolant channel is provided to collect the coolant. Instead of a coolant inlet in the wet chamber housing, coolant can be introduced into the wet chamber housing via the drive shaft, and/or the auxiliary output shaft, and/or a gap between them.

In another embodiment, the wet chamber housing has a feed-through that accommodates the first contact plate or the second contact plate, or a transmission element connected to the first or second contact plate, so that it is positionable between the lever mechanism and the respective contact plate in the axial direction. The feed-through is preferably sealed by means of an O-ring seal.

Alternatively, or additionally, the wet chamber housing can have a feed-through through which an additional drive clutch housing or an additional auxiliary power take-off clutch housing is carried out from the wet chamber housing. That acts as a contact plate and in addition carries a friction lining or friction lining pack in the radial direction. The feed-through is preferably sealed by means of O-ring seals.

In another form of the present invention, the wet chamber housing or the second wet chamber housing half can be sealed in relation to the drive shaft and/or the auxiliary output shaft by means of an oil seal. That brings about an especially effective and reasonably-priced sealing of the wet chamber enclosed by the wet chamber housing.

In another embodiment of the present invention, the drive clutch can have a disk carrier that is non-rotatably connected to the drive shaft, and the auxiliary power take-off clutch can have a disk carrier that is non-rotatably connected to the auxiliary output shaft.

The drive clutch can have a disk carrier. The latter is non-rotatably positioned on the drive shaft, for example by means of a toothed connection. The auxiliary power take-off clutch can likewise have a disk carrier. The latter is non-rotatably positioned on the auxiliary output shaft, for example by means of a toothed connection. The disk carrier or carriers may can be a formed sheet metal part, for example a deep drawn part, and can carry the friction lining, for example on an outer edge segment.

The clutch housing of the dual clutch can be formed essentially of a clutch base plate, also referred to as the clutch housing, and a base plate carrier, which are designed as an essentially bell-shaped, formed sheet metal part, for example as a deep drawn part. The clutch base plate and base plate carrier can be welded together. A plurality of lever holders, also referred to as lever bearing blocks, can be positioned on the clutch base plate, for example by means of rivets. Each lever holder serves as a pivot support for an actuating lever for one of the clutches.

The clutch housing, for example in particular the base plate carrier, can be connected to an arc-shaped spring damper unit by means of a toothed connection, and can be coupled with it rotationally. The latter can be connected to a flywheel, which in turn can be connected to the drive unit. It is particularly advantageous if the clutch housing, in particular the base plate carrier, is supported in the axial direction by means of a journal bearing unit or similar bearing unit, in particular on the flywheel. In that way, relative movements between the flywheel and the clutch housing or base plate carrier can be absorbed. One of the shafts, the auxiliary output shaft or the drive shaft, can be supported on the flywheel by means of a roller bearing.

The friction lining of the auxiliary power take-off clutch can be positioned between the clutch housing, in particular the clutch base plate, and the disk carrier. Its disks are arranged in the axial direction and can be pressed together in the axial direction by means of the contact plate between the latter and the clutch housing, in particular the base plate carrier. The friction lining of the drive clutch can be located radially inside the plate carrier between the latter and a drive clutch housing. Its disks are arranged in the axial direction and can be pressed together in the axial direction by means of the contact plate between the latter and the drive clutch housing.

The lever mechanism for the auxiliary power take-off clutch can include an actuating lever that is pivotable about a pivot axis and is biased by means of a spring. It can carry a peg on which an actuating means, for example an eye bolt, is positioned so that it can pivot. The actuating means is operationally connected to the contact plate in the axial direction. The contact plate and actuating means are preferably fixed in positions that are adjustable relative to one another. The actuating lever can be in contact with an adjuster ring. The latter is preferably supported relative to a locating pin by means of a roller bearing system, so that relative rotation between adjuster ring and locating pin is possible and position changes of the locating pin in the axial direction are transmitted to the adjuster ring.

Alternatively, the actuating lever can be provided with a threaded through hole running in the axial direction, into which an adjusting screw is screwed. The latter can extend through the actuating lever in the axial direction and be in contact with a drive clutch housing. The clutch can be adjusted by repositioning the adjusting screw relative to the actuating lever. The drive clutch housing can function as a contact plate, and in particular can have a collar that is located on the side of the disk pack facing away from the actuating lever in the axial direction, and that presses the disk pack in the axial direction against the clutch housing or the clutch base plate when actuated by the actuating lever.

Between the drive clutch housing and the contact plate (a part of the contact plate or a clutch base plate) of the auxiliary power take-off clutch, a power storage unit, for example a diaphragm spring, is advantageously positioned. It can also be said that the contact plate and the drive clutch housing are under tension with one another in the axial direction by means of the diaphragm spring.

Expressed differently and in summary, the dual clutch according to the present invention, which can, for example, be a tractor dual clutch, that has two clutches—one for the propulsion drive and one for the auxiliary power take-off (power take-off shaft). Each of the two clutches is actuated by means of a disengaging system present on the vehicle. This system sets the lever mechanism of the relevant clutch in motion, which results in disengaging or engaging the friction device. In particular, the clutches can be actuated simultaneously and engaged simultaneously. An increase in the torque can be enabled by adding additional frictional and steel disks. The construction space remains nearly the same when that is carried out. Parts of the dual clutch are located in a sealed waste housing that is non-rotatably connected to a transmission bell housing of the motor vehicle. Attached thereto is a connection that serves as an outlet and is located on the bottom of the waste housing to carry oil back to the oil sump of the transmission. The input of the cooling oil can occur through a separate connection in the waste housing, or through a transmission input shaft in the form of a hollow shaft, or through a gap between a solid shaft and a hollow shaft as transmission input shafts. The drive clutch and power take-off shaft clutch can be damped by using an arc-shaped spring damper. The friction system can be subjected beneficially to an oil volume flow whose task is to remove frictional heat that has developed in the clutch. Increased service life of the friction system also results.

According to the invention, the lever mechanism is located outside the wet chamber capsule. The friction linings or disk packs with disk carriers are located within the wet chamber. In that case, the clutch housing, in particular the clutch base plate, contributes fundamentally to the sealing of the wet chamber. Between the clutch base plate and the wet chamber waste housing is a large seal, in particular a labyrinth seal, which seals the wet chamber off from the surroundings.

The wet dual clutch according to the present invention, which can be realized in particular as a tractor dual clutch, offers several advantages in comparison to known dry systems. Heat can be removed effectively through oil cooling, which guarantees operation with a long service life, even under heavy loads. Because of low friction on the friction surfaces, there is little wear on the friction linings. It is easy to adapt to increases in torque with very little effect on construction space by the number of friction linings. A disengaging system previously used or installed on the motor vehicle can be taken over unchanged to actuate the clutch. All-in-all, only slight changes need to be made to the vehicle.

Multiple embodiments of the invention will be explained in greater detail below on the basis of drawings.

DESCRIPTION OF THE PREFERRED EMBODIMENTS

The figures are merely schematic in nature, and serve only to aid in understanding the present invention. The same elements are identified by the same reference numerals. Details of the different embodiments can be combined with one another.

Figures 1, 9:
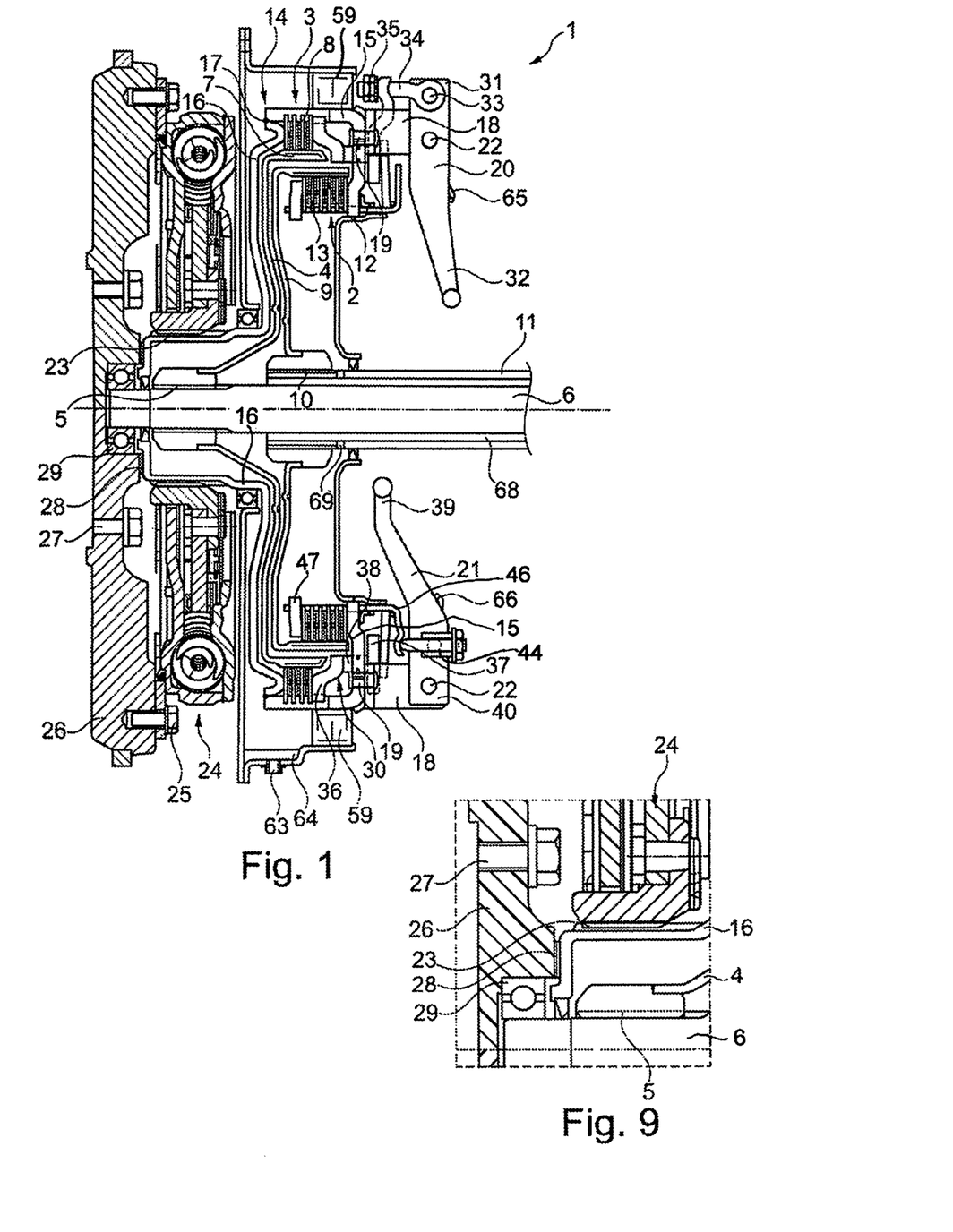
FIG. 1 is a schematic sectional view of a dual clutch according to the present invention and having a drive shaft clutch and a power take-off shaft clutch.
FIG. 9 shows an enlarged detail of the axial support of the dual clutch of FIG. 1.

FIG. 1 shows a dual clutch 1 according to the present invention. It includes a first, radially inner clutch unit 2, in the present exemplary embodiment a drive shaft clutch 2, and a second, radially outer clutch unit 3, in the present exemplary embodiment a power take-off shaft clutch 3. The dual clutch 1 is designed as a wet clutch.

Figure 2:
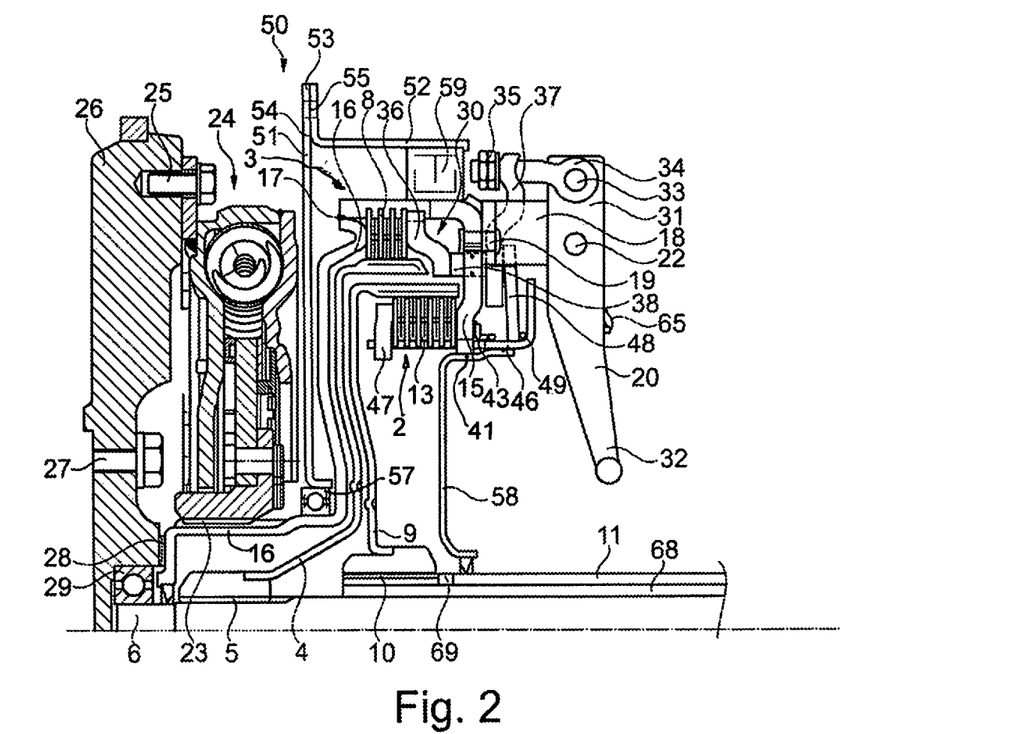
FIG. 2 is an enlarged detail of the power take-off clutch of FIG. 1.
Figure 3:
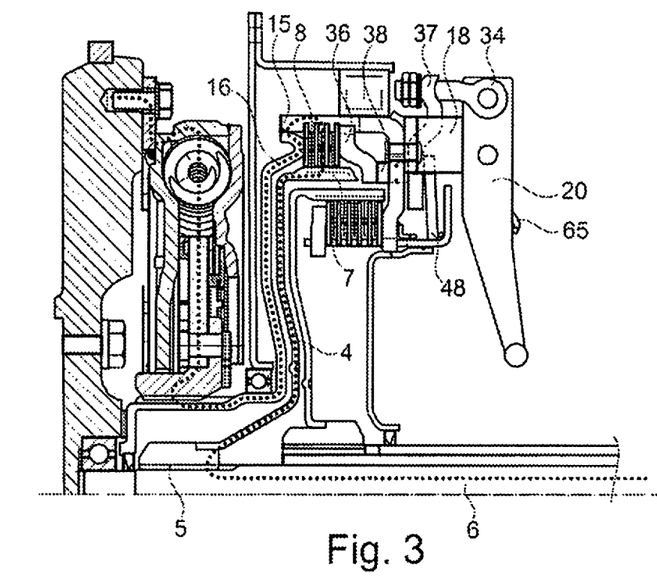
FIG. 3 shows the flow of torque in the power take-off shaft clutch of the dual clutch of FIG. 1.

Referring to FIG. 2, power take-off shaft clutch 3 has a disk carrier 4, that is non-rotatably positioned on a power take-off shaft 6 by means of power take-off shaft toothed connection 5. The disk carrier 4 is an essentially bell-shaped formed sheet metal part, for example a deep drawn part, and carries a disk pack 8 on the outer side of its radially outer edge segment 7.

The drive shaft clutch 2 has a disk carrier 9, that is non-rotatably positioned on a drive shaft 11 by means of drive shaft toothed connection 10. The disk carrier 9 is an essentially bell-shaped formed sheet metal part, for example a deep drawn part, and carries a disk pack 13 on the inner side of its radially outer edge segment 12.

Furthermore, the dual clutch 1 has a clutch housing 14. The latter is formed essentially of a clutch base plate 15, also referred to as the power take-off clutch housing 14, and a base plate carrier 16, that are each designed as an essentially bell-shaped formed sheet metal part, for example as a deep drawn part. The clutch base plate 15 and the base plate carrier 16 are welded together by means of a welded seam 17 running in the circumferential direction. Positioned on the clutch base plate 15 are a plurality of lever holders 18, also referred to as lever bearing blocks 18, by means of rivets 19. Each lever holder 18 serves as a pivot support for an actuating lever 20 for the power take-off shaft clutch 3 or for an actuating lever 21 (see FIG. 1) for the drive shaft clutch 2, in each case about a respective pivot axis 22 located in a respective lever holder 18.

The base plate carrier 16 is connected to an arc-shaped spring damper unit 24 through a toothed connection 23, and is thereby coupled rotationally with the arc-shaped spring damper unit 24. The latter has a flange by means of threaded connections 25 and is connected to a flywheel 26, which in turn is connected by means of threaded connections 27 to a drive (not shown), for example an internal combustion engine.

As shown in particular in FIG. 9, the base plate carrier 16 is supported on the flywheel 26 in the axial direction by means of a journal bearing unit 28. The journal bearing unit 28 serves to enable relative movements between the flywheel 26 and the base plate carrier 16, which is non-rotatably positioned in contact with the arc-shaped spring damper unit 24. Furthermore, the power take-off shaft 6 is supported in the flywheel 26 by means of a roller bearing 29. The result is that the base plate carrier 16 rotates at the drive speed $N_{an}$, and with it also the clutch base plate 15, as shown in FIG. 1, aside from rotation speed fluctuations due to a damping effect brought about by means of the arc-shaped spring damper unit 24.

As best seen in FIG. 2, the disk pack 8 of the power take-off shaft clutch 3 is positioned between the clutch base plate 15 and the disk carrier 4. Its disks are arranged in the axial direction, and can be pressed together in the axial direction by means of a contact plate 30 between the latter and the base plate carrier 16, so that torque is transmitted from the flywheel 26 through the arc-shaped spring damper unit 24, the toothed connection 23, the base plate carrier 16, the clutch base plate 15, the disk pack 8, the disk carrier 4 and the power take-off shaft toothed connection 5 to the power take-off shaft 6.

The disk pack 13 of the drive shaft clutch 2 is located radially inside the disk carrier 9 between the latter and a drive clutch housing 46. Its disks are arranged in the axial direction, and can be pressed together by means of the drive clutch housing 46 between the latter and the clutch base plate 15, so that torque is transmitted from the flywheel 26 through the arc-shaped spring damper unit 24, the toothed connection 23, the base plate carrier 16, the clutch base plate 15, the disk pack 13, the disk carrier 9, and the drive shaft toothed connection 10 to the drive shaft 11.

As shown in FIG. 1, contact plate 30 consists essentially of an inner contact plate part 36 and an outer contact plate part 37. The inner contact plate part 36 is positioned on the side of the clutch base plate 15 facing toward the disk pack 8 (the inner side or wet side of the clutch). The outer contact plate part 37 is positioned on the side of the clutch base plate 15 facing away from the disk pack 8 (toward the outer side or dry side of the clutch). The inner contact plate part 36 and the outer contact plate part 37 are connected to one another by means of a thrust cylinder 38, which extends through an opening formed in the axial direction in the clutch base plate 15. The thrust cylinder 38 is sealed in relation to the clutch base plate 15 by means of an O-ring seal, and is movable in the axial direction in the opening in the clutch base plate 15, relative to the latter.

The actuating lever 20 for the power take-off shaft clutch 3 has an outer lever end 31 formed radially outside the pivot axis 22, and an inner lever end 32 formed radially inside the pivot axis 22, and is pre-biased by means of a torsion spring 65. The outer lever end 31 includes a peg 33 on which an eye bolt 34 is carried by means of its eye so that it can pivot around the peg 33. The end of the eye bolt 34 opposite the eye is provided with threads and extends through an opening provided in the outer contact plate part 37 in the axial direction. The outer contact plate part 37 and the eye bolt 34 are fixed in the axial direction in positions that are adjustable relative to one another by means of a threaded connection with lock nut 35. The radially inner lever end 32 works together with a conventional release unit which is not shown in the drawings, and by means of the latter is able to be moved in the axial direction.

As shown in FIG. 1, actuating lever 21 for the drive shaft clutch 2 has a radially inner lever end 39 formed radially inside the pivot axis 22, and is pre-biased by means of a torsion spring 66. The radially outer lever end 40 of the actuating lever 21 is provided with an opening through which the pivot axis 22 extends. The inner lever end 39 works together with a release unit (not shown) and by means of the latter is able to be actuated in the axial direction. Radially inside the pivot axis 22, the actuating lever 21 is provided with a threaded through opening 44 running in the axial direction. An adjusting screw 45 is screwed into the latter, which extends through the actuating lever 21 in the axial direction and is in contact with the drive clutch housing 46. The drive clutch 2 can be adjusted by repositioning the adjusting screw 45 relative to the actuating lever 21. The drive clutch housing 46 has a collar 47 that is located on the side of the disk pack 13 facing away from the actuating lever 21 in the axial direction, and presses the disk pack in the axial direction against the clutch base plate 16 by actuation of the actuating lever 21.

Figure 4:
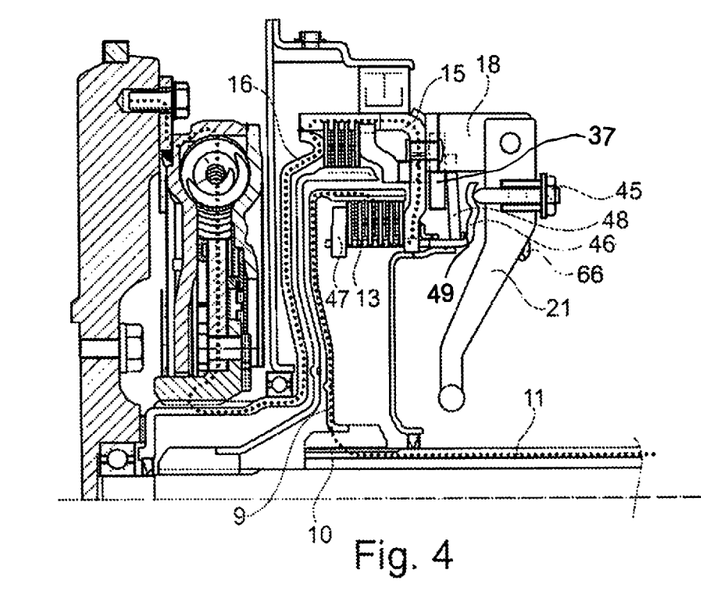
FIG. 4 shows the flow of torque in the drive shaft clutch of the dual clutch of FIG. 1.

Positioned between the drive clutch housing 46 and the outer contact plate part 37 is a diaphragm spring 48 (see FIG. 4). The radially inner side of the diaphragm spring 48 rests against the drive clutch housing 46, with a metal ring 49 inserted in between. The radially outer side of the diaphragm spring 48 is in contact with the contact plate part 37. It can also be noted that the outer contact plate part 37 and the drive clutch housing 46 are under tension with one another in the axial direction by means of the diaphragm spring 48.

Figure 5:
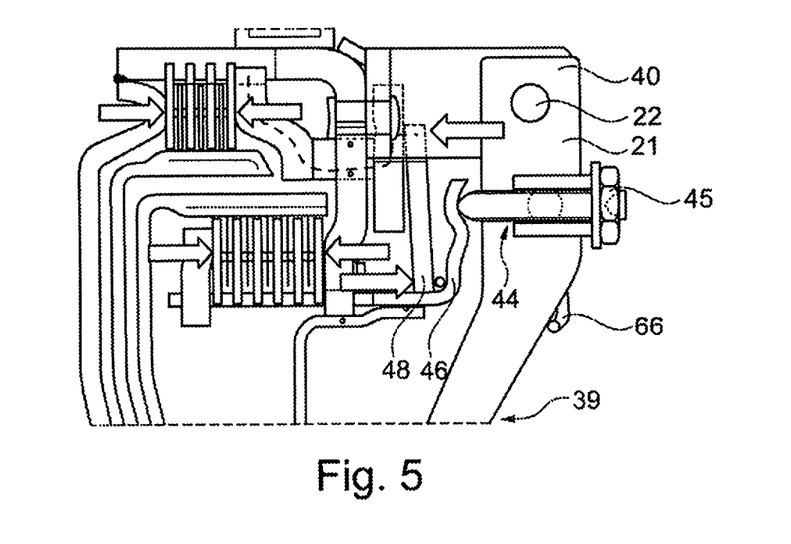
FIG. 5 shows a basic layout diagram of clutch forces in the deactivated state.

The drive shaft clutch 2 and the power take-off shaft clutch 3 are actuatable independently of one another. In the non-actuated state, both the power take-off shaft clutch 3 and the drive shaft clutch 2 are engaged (normally closed). The pressure force necessary to engage the clutches 2, 3 and press the disk packs 8, 13 together is produced by the diaphragm spring 48. The non-actuated state is shown in FIG. 5.

Figure 6:
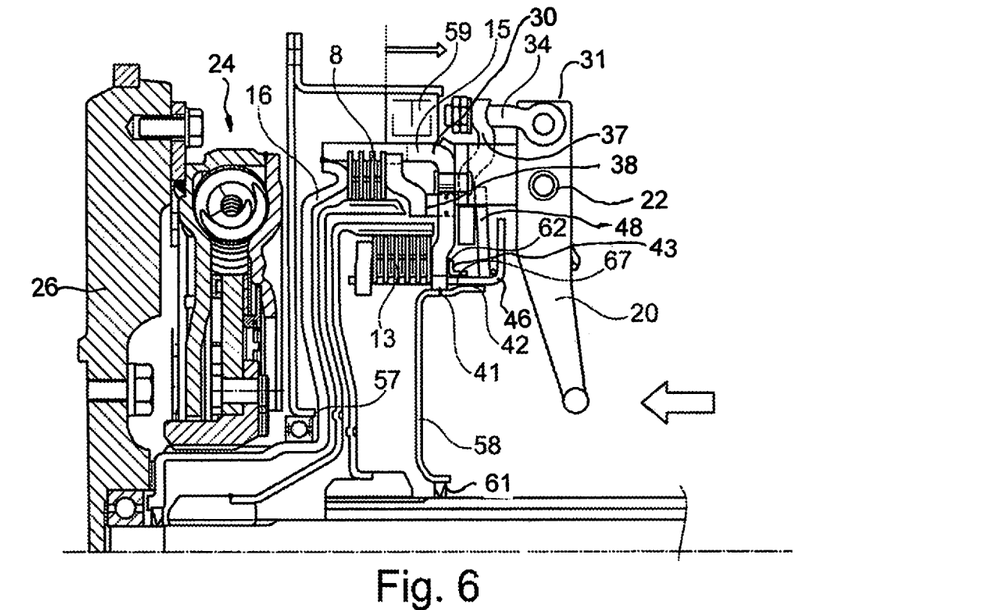
FIG. 6 shows a basic layout diagram of the actuation of the power take-off shaft clutch.

The description of the actuation of the power take-off shaft clutch 3 is provided with reference to FIG. 6. Relative to the non-actuated state, the actuating lever 20 is pivoted clockwise about the pivot axis 22 by means of the release unit, which is not shown in the drawings. The outer lever end 31 moves in the axial direction away from the flywheel 26, taking the eye bolt 34 with it. The outer contact plate part 37 together with the thrust cylinder 38 and the inner contact plate part 36 is moved away from the disk pack 13 toward the diaphragm spring 48, so that the latter is no longer clamped between the contact plate 30 and the base plate carrier 16 and the power take-off shaft clutch 3 disengages.

Figure 7:
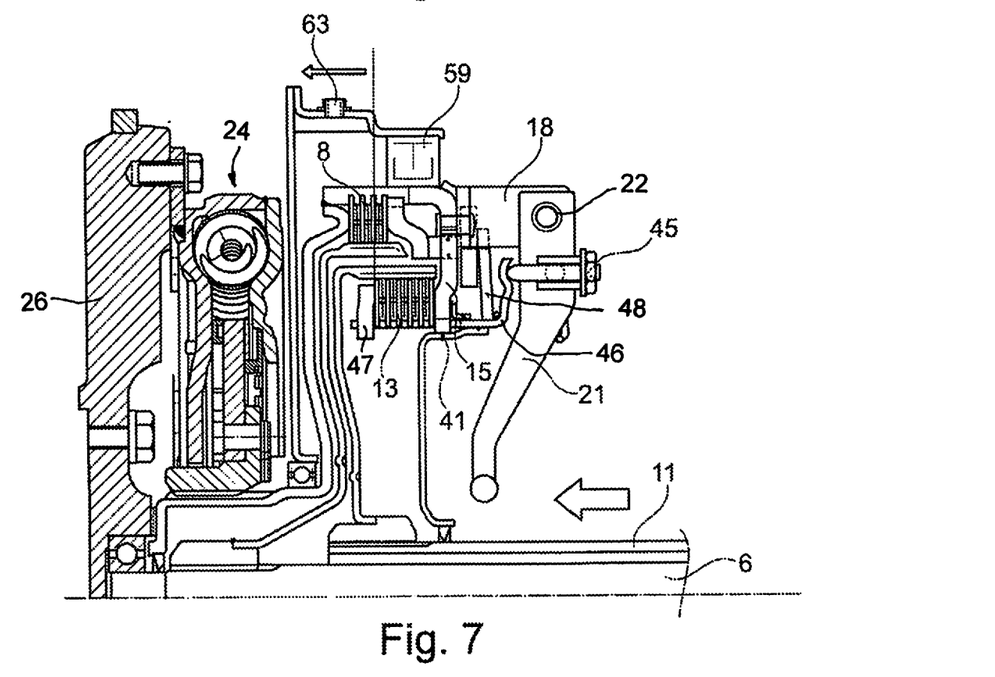
FIG. 7 shows a basic layout diagram of the actuation of the drive shaft clutch.

The description of the actuation of the drive shaft clutch 2 is provided with reference to FIG. 7. Relative to the non-actuated state, the actuating lever 21 is pivoted clockwise about the pivot axis 22 by means of the release unit (not shown). The pivoting of the actuating lever 21 causes a shift of the adjusting screw 45 in the direction of the flywheel 26. The drive clutch housing 46 with the collar 47 is moved toward the diaphragm spring 48 in the direction of the flywheel and away from the disk pack 13, so that the latter is no longer clamped between the collar 47 and the clutch base plate 15 and the drive shaft clutch 2 disengages.

Figure 10:
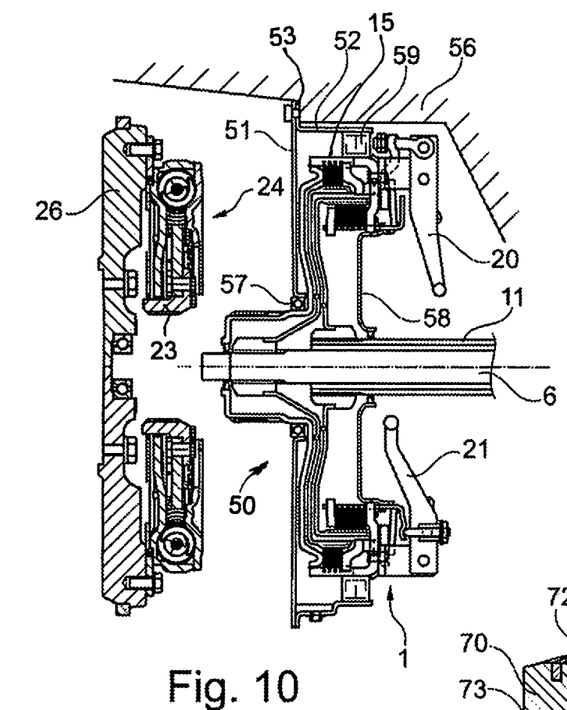
FIG. 10 is a schematic view showing the installation of the dual clutch of FIG. 1 on a vehicle.

As best seen in FIG. 2, dual clutch 1 according to the present invention is designed as a wet clutch, and is therefore sealed against the environment by means of a housing 50. The housing 50 has a first housing part 51, also referred to as the engine-side wet chamber cover, a second housing part 52, also referred to as the outer wet chamber cover, a third housing part 58, also referred to as the transmission-side wet chamber cover, and a fourth housing part 43 in the form of a housing ring. All four housing parts 51, 52, 58, 43 are formed sheet metal parts. The first housing part 51 and the second housing part 52 are tightly connected to one another by means of a flange 53, with a housing seal 54 interposed. The flange 53 has a passage opening 55 or a plurality of passage openings 55, with which the housing 50 and thus the dual clutch 1 is mounted on a structure of a vehicle as shown in FIG. 10, for example on a transmission housing 56 of a tractor. The base plate carrier 16 is supported opposite the first housing part 51 by means of a roller bearing 57. The second housing part 52 is sealed in relation to the clutch base plate 15 by means of a seal 59, for example a labyrinth seal.

As shown in FIG. 6, the third housing part 58 is welded to the clutch base plate 15 by means of a welded seam 41, and is sealed in relation to the drive clutch housing 46 by means of an O-ring seal 42. The fourth housing part 43 is likewise welded to the clutch base plate 15 by means of a welded seam 62, and is sealed in relation to the drive clutch housing 46 by means of a and O-ring seal 67. Stated differently, the drive clutch housing 46 is accommodated radially between the third housing part 58 and the fourth housing part 43 so that it is movable in the axial direction. To further seal off the interior of the dual clutch 1 enclosed by the housing 50, the roller bearing 57 is designed as a sealed bearing. The base plate carrier 16 is sealed in relation to the power take-off shaft 6 by means of an oil seal 60. Finally, the third housing part 58 is sealed in relation to the driveshaft 11 by means of an oil seal 61.

Figure 8A:
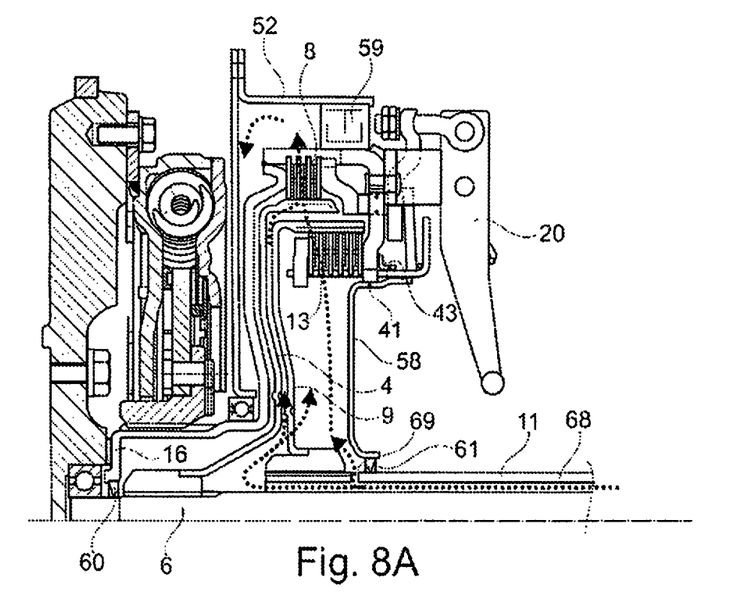
FIGS. 8A and 8B show basic layout diagrams of the cooling oil flow directions within the clutch.
Figure 8B:
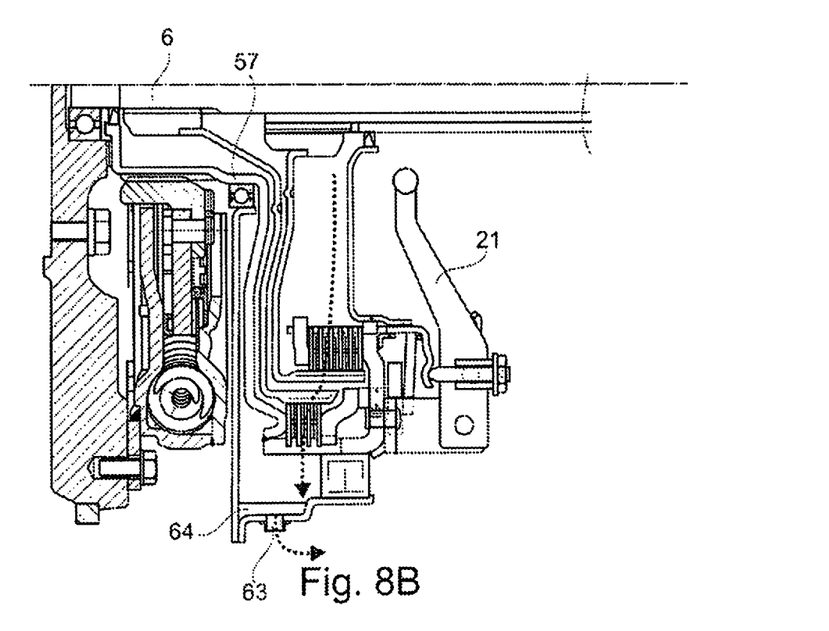

In the illustrated embodiment, cooling oil is introduced into the interior of the housing 50 through a gap 68 between the power take-off shaft 6 and the drive shaft 11 (see for example FIG. 8A) and oil holes bored in the driveshaft. The second housing part 52 has a feed-through for an oil drain 63 (see, for example, FIG. 8B). Cooling oil (at approx. 80° C.) introduced into the housing 50 through the gap 68 and the oil bores 69 in drive shaft 11, for example from the oil sump of the transmission, is distributed in the interior of the housing 50, for example flung radially outward, due to the rotation of the clutch components accommodated in the housing 50, for example the power take-off shaft 6, the drive shaft 11, the disk carriers 4 and 9, and the parts moved thereby. The oil wets the disk packs 8 and 13 that are heating up during operation of the clutch and cools them down. The oil drain 63 is provided at the radially lowest point of the housing 50, so that oil that collects in a channel 64 and has been heated by operation of the clutch can be removed easily from the housing 50, for example to the oil sump of the transmission. The oil flow through the dual clutch is represented by the dashed lines in FIGS. 8A and 8B.

The principle of installation of the dual clutch 1 on the vehicle is shown in FIG. 10. First, the dual clutch 1 accommodated and installed in the housing 50 is mounted on the transmission housing 56 of the vehicle, by being screwed to the latter by means of the flange 53. As the mounting step is carried out, the outer ends of the actuating levers 20, 21, designed in the form of corresponding interfaces, are connected to conventional throw-out bearings (not shown) provided on the vehicle. Next, the arc-shaped spring damper unit 24 is joined with the dual clutch 1 by means of the toothed connection 23, designed for example as a splined shaft profile.

Figure 11:
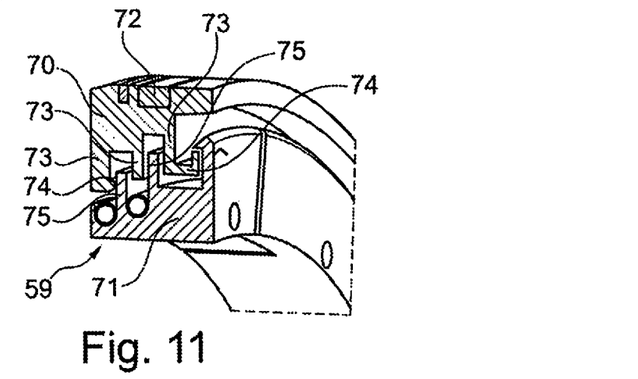
FIG. 11 shows a perspective partial sectional view of a housing seal.
Figure 12:
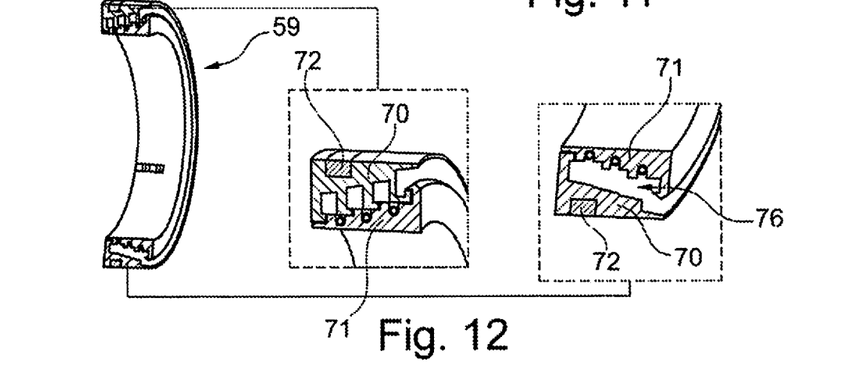
FIG. 12 shows basic layout diagrams of the components of the housing seal of FIG. 11.

The labyrinth seal 59 is shown in detail in FIGS. 11 and 12. It has an outer ring 70 and an inner ring 71. The outer ring 70 is accommodated in the second housing part 52 and sealed in relation thereto, with a seal 72 interposed. The inner ring 71 is positioned on the clutch base plate 15, and rotates together with it. The outer ring 70 has, in its upper half, webs 73 running in the radial direction, which are formed into U-shaped catch troughs 74 at their inner ends. The lower half of the outer ring 70 is flattened out into an inclined plane 76. The inner ring 71 has continuous annular webs 75 that extend between the webs 73 of the outer ring 70.

The outside diameter of the inner ring 71 on the inner side of the clutch is greater than its outside diameter on the outer side of the clutch. The inside diameter of the outer ring 70 on the inner side of the clutch is greater than its inside diameter on the outer side of the clutch. In that way, a gap running obliquely radially inward from the inner side of the clutch to the outer side of the clutch is formed between the outer ring 70 and the inner ring 71. Because of the rotation of the latter together with the clutch base plate 15, cooling oil that gets onto the inner ring is flung outward into the spaces between the webs 73 of the outer ring 70, runs down on these into the catch troughs 74, and is guided along the inclined plane in the lower half of the outer ring 70 back into the clutch housing.

What is claimed is:

1. A multi-plate dual clutch for coupling an engine of a motor vehicle to a drive shaft of a transmission for the motor vehicle and to an auxiliary output shaft of an auxiliary power take-off of the motor vehicle, said multi-plate dual clutch comprising:
    a drive clutch for coupling the motor vehicle engine with a drive shaft of the multi-plate dual clutch;
    an auxiliary power take-off clutch for coupling the motor vehicle engine with an auxiliary output shaft of the multi-plate dual clutch;
    wherein the drive clutch and the auxiliary power take-off clutch can each be actuated separately from one another by means of a respective separate lever mechanism;
    wherein the multi-plate dual clutch includes a fluid-tight wet chamber housing in which the drive clutch and the auxiliary power take-off clutch are received; and
    wherein the respective lever mechanisms for the drive clutch and the auxiliary power take-off clutch are located outside the wet chamber housing.

2. The multi-plate dual clutch according to claim 1, wherein the multi-plate dual clutch includes a clutch housing for receiving and supporting the respective lever mechanisms;
    wherein a drive clutch friction lining coupled with the drive shaft is positioned so that it can be pressed between a first contact plate and the clutch housing;
    wherein an auxiliary output clutch friction lining coupled with the auxiliary output shaft is positioned so that it can be pressed between a second contact plate and the clutch housing; and
    wherein the first contact plate and the second contact plate are each movable in an axial direction of the multi-plate dual clutch by a lever mechanism to selectively engage the drive clutch and the auxiliary power take-off clutch.

3. The multi-plate dual clutch according to claim 2, wherein the wet chamber housing rests against the clutch housing and is sealed in relation thereto by a seal.

4. The multi-plate dual clutch according to claim 1, wherein the wet chamber housing includes a first wet chamber housing half having a first housing part and a second housing part, which first and second housing parts are connected to one another in fluid-tight relationship.

5. The multi-plate dual clutch according to claim 4, wherein the wet chamber housing includes a second wet chamber housing half that is firmly connected to the clutch housing and is in contact with at least one of the drive shaft or the auxiliary output shaft to provide a seal therebetween.

6. The multi-plate dual clutch claim 1, wherein the wet chamber housing includes a flange for connecting the wet chamber housing to the motor vehicle.

7. The multi-plate dual clutch according to claim 1, wherein the wet chamber housing includes a housing part that forms a bearing seat.

8. The multi-plate dual clutch according to claim 1, wherein the wet chamber housing includes a coolant inlet and includes a coolant outlet located on an underside of the wet chamber housing.

9. The multi-plate dual clutch according to claim 2, wherein the clutch housing includes a feed-through in which at least one of the first contact plate or the second contact plate, and a transmission element connected to at least one of the first contact plate and the second contact plate, are positioned between the lever mechanism and the respective contact plate in an axial direction of the multi-plate dual clutch.

10. The multi-plate dual clutch according to claim 4, wherein the first housing part and the second housing part are each formed sheet metal parts.

11. The multi-plate dual clutch according to claim 4, wherein a labyrinth seal is positioned between the second housing part and an auxiliary power take-off clutch base plate carrier that carries a clutch disk pack.

12. A multi-plate dual clutch comprising:
    a fluid-tight wet chamber housing;
    a drive clutch disposed within the fluid-tight wet chamber housing and arranged for coupling an engine to a transmission drive shaft;
    a first lever mechanism disposed outside of the fluid-tight wet chamber housing and arranged for actuating the drive clutch;
    a power take-off clutch disposed within the fluid-tight wet chamber housing and arranged for coupling the engine to an auxiliary output shaft; and,
    a second lever mechanism disposed outside of the fluid-tight wet chamber housing and arranged for actuating the power take-off clutch.

13. The multi-plate dual clutch of claim 12, wherein the fluid-tight wet chamber housing comprises:
    a clutch housing for receiving and supporting the first lever mechanism and the second lever mechanism;
    a second wet chamber housing half firmly connected to the clutch housing; and,
    a seal for sealing the second wet chamber housing half to at least one of the transmission drive shaft or the auxiliary output shaft.

14. The multi-plate dual clutch of claim 12, wherein the fluid-tight wet chamber housing comprises a housing part with a bearing seat.

15. The multi-plate dual clutch of claim 12, wherein the fluid-tight wet chamber housing comprises:
- a coolant inlet; and,
- a coolant outlet disposed on an underside of the fluid-tight wet chamber housing.

16. The multi-plate dual clutch of claim 12 further comprising:
- a clutch housing for receiving and supporting the first lever mechanism and the second lever mechanism;
- a first contact plate;
- a drive clutch friction lining arranged to be pressed between the clutch housing and the first contact plate;
- a second contact plate; and,
- a power take-off clutch friction lining arranged to be pressed between the clutch housing and the second contact plate, wherein:
  - the first contact plate is axially moveable by the first lever mechanism to engage the drive clutch; and,
  - the second contact plate is axially moveable by the second lever mechanism to engage the power take-off clutch.

17. The multi-plate dual clutch of claim 16 further comprising:
- a transmission element, wherein:
  - the clutch housing comprises a feed-through; and,
    - the transmission element is connected to the first contact plate; and,
    - the transmission element and the first contact plate are axially positioned in the feed-through between the first contact plate and the first lever mechanism; or,
  - the transmission element is connected to the second contact plate; and,
    - the transmission element and the second contact plate are axially positioned in the feed-through between the second contact plate and the second lever mechanism.

18. The multi-plate dual clutch of claim 12, wherein the fluid-tight wet chamber housing comprises:
- a first wet chamber housing half comprising:
  - a first housing part; and,
  - a second housing part connected fluid-tight to the first housing part.

19. The multi-plate dual clutch of claim 18, wherein the first housing part and the second housing part are each formed sheet metal parts.

20. The multi-plate dual clutch of claim 18, further comprising:
- a power take-off clutch base plate carrier; and,
- a labyrinth seal positioned between the second housing part and the power take-off clutch base plate carrier.

* * * * *